Patented Aug. 4, 1925.

1,548,145

UNITED STATES PATENT OFFICE.

PAUL KEEVER, OF WEST CHESTER, PENNSYLVANIA.

ABRASIVE FORM, ITS COMPOSITION AND METHOD OF MAKING THE SAME.

No Drawing. Application filed February 24, 1921. Serial No. 447,564.

*To all whom it may concern:*

Be it known that I, PAUL KEEVER, a citizen of the United States, residing at West Chester, in the county of Chester, State of Pennsylvania, have invented certain new and useful Improvements in Abrasive Forms, Their Composition and Methods of Making the Same, of which the following is a description.

My invention relates to abrasive forms, and has particular bearing on the control of the hardness thereof as well as the undesirable quality common to abrasive forms known as "glazing".

My abrasive forms consist primarily of an abrasive and a binder. Any suitable abrasive may be used, but that which I prefer to use in known in the industry as "bathite" and is described in the pamphlet entitled "White heat grinding wheels," copyright, 1920, by White Heat Products Company.

My binder consists before the heat treatment, of two intermixed parts:—A temporary binder, which functions as a binder during the moulding and burning processes and may be composed, for instance, of a commercial liquid sodium silicate, containing one part of sodium oxide to two parts of silica, which I dilute with water until its specific gravity becomes 1550 or thereabouts, and a permanent binder, which becomes such during the burning process.

The various ingredients, namely, the abrasive, the temporary binder and the permanent binder, may be used in a great number of varying proportions to each other, but the proportions and ingredients I find to give a typical abrasive wheel or other form are,—

Bathite, 32 pounds; glass, 4 pounds; clays (slip clay, ball clay, kaolin, etc.), ½ to 1½ pounds; temporary binder, 24 ounces.

The glass and clays serve as the permanent binders, and I have found that the use of these substances in about the proportions stated has the effect of preventing "glazing" while the finished product is being used. Other proportions of the ingredients will have a similar effect, but too great a deviation therefrom will produce less desirable results. For example, too much clay causes undue expansion during the baking processes resulting in the production of distorted ware. I, therefore, prefer about the proportions stated.

An additional important feature of my invention is the fact that for certain grades of abrasive wheels or forms, I can substitute, before moulding, a particular type of sodium silicate in place of the glass. This special type of sodium silicate consists of a dry powder containing one part of sodium oxide to about three and one-fourth parts of silica. I have found that an excellent composition for these wheels or forms consists of about:—

32 pounds of abrasive grains, 6 pounds of dry sodium silicate, 24 ounces of temporary binder as described above, ¼ to 3 pounds of clays.

By slip clay is meant, that variety of clay commonly used by abrasive wheel manufacturers, on account of its comparatively low fusion or melting point.

By ball clay is meant, that variety of clay commonly used by abrasive manufacturers on account of the grading control its presence exerts.

I have found that by varying the amount of ball clay in the above compositions, I can vary the hardness of the wheel. An addition of ball clay decreases the hardness of the wheel and at the same time decreases the tendency to glaze. The clays, that is ball clay and slip clay play a three-fold part when composing these abrasive forms. 1st., particularly slip clays act as permanent binders. 2nd., by varying their proportion, the grade of hardness of the wheel is controlled, and 3rd., the presence of the clay, especially ball clay tends to prevent glazing.

An additional important advantage of my invention is that in making up my composition for moulding I can produce the desired results by using but a very small quantity of water,—in fact, so little is used that with the 24 ounces of diluted sodium silicate going into the average mixture, the mixture feels quite dry to the touch, and it is not necessary to dry out the material after the objects have been freshly pressed. They can immediately be put into the fire, which procedure would ruin an object made by the older known processes.

"Grade" refers to the degree of hardness of abrasive wheels or forms. I use the glass-clay bonded wheels for medium and medium hard grade wheels, and the dry sodium silicate-clay bonded wheels for medium grade to soft wheels or forms.

Having thus described the invention, what I claim as new and desire to secure by Letters Patent, is:—

1. A composition of matter for making abrasive forms adapted to be set permanently by baking and to be subjected to baking heat immediately on being formed, comprising an abrasive, glass, clay, a dry sodium silicate, and a temporary binder.

2. A composition of matter for making abrasive forms adapted to be set permanently by baking and to be subjected to baking heat immediately on being formed, comprising an abrasive, glass, clay, dry sodium silicate containing one part of sodium oxide to about three and one-fourth parts of silica and a temporary binder.

3. A composition of matter for making abrasive forms adapted to be set permanently by baking and to be subjected to baking heat immediately on being formed, comprising an abrasive, glass, clay, a temporary binder containing sufficient water to make the mass moldable, but only such an amount of water that the mass is capable of absorbing moisture from a wet hand.

4. A composition of matter for making abrasive forms adapted to be set permanently by baking and to be subjected to baking heat immediately on being formed, comprising an abrasive, glass, clay, a dry sodium silicate, and a temporary binder containing sufficient water to make the mass moldable but only such an amount of water that the mass is capable of absorbing moisture from a wet hand.

5. A composition of matter for making abrasive forms adapted to be set permanently by baking and to be subjected to baking heat immediately on being formed, comprising an abrasive, glass, clay, dry sodium silicate containing one part of sodium oxide to about three and one-fourth parts of silica, and a temporary binder containing sufficient water to make the mass moldable, but only such an amount of water that the mass is capable of absorbing moisture from a wet hand.

6. The method of making an abrasive form adapted to be set permanently by baking and to be subjected to baking heat immediately on being formed, which comprises adding a temporary binder containing water to a composition of matter for making the abrasive forms, the water being in sufficient quantity to make the mass moldable but only such an amount of water that the mass is capable of absorbing moisture from a wet hand, molding the mass, and firing the mass immediately after molding.

7. The method of making an abrasive form adapted to be set permanently by baking and to be subjected to baking heat immediately on being formed comprising mixing a temporary binder containing water with a mass comprising an abrasive, glass, and clay,—the water being in sufficient quantity to make the mass moldable but only such an amount of water that the mass is capable of absorbing moisture from a wet hand, molding the mass and firing it immediately after molding.

8. The method of making an abrasive form adapted to be set permanently by baking and to be subjected to baking heat immediately on being formed comprising mixing a temporary binder containing water with a mass comprising an abrasive, glass, clay and a dry sodium silicate, the temporary binder being in sufficient quantity to make the mass moldable but only such an amount of water that the mass is capable of absorbing moisture from a wet hand, molding the mass, and firing it immediately after molding.

9. The method of making an abrasive form adapted to be set permanently by baking and to be subjected to baking heat immediately on being formed, comprising mixing a temporary binder containing water with a mass comprising an abrasive, glass, clay and dry sodium silicate containing one part of sodium oxide to about three and one-fourth parts of silica, the temporary binder, being in sufficient quantity to make the mass moldable but only such an amount of water that the mass is capable of absorbing moisture from a wet hand, molding the mass and firing it immediately after molding.

10. A composition of matter for making abrasive forms adapted to be set permanently by baking and to be subjected to baking heat immediately on being formed, comprising an abrasive, dry sodium silicate, clay, a temporary binder containing sufficient water to make the mass moldable but only such an amount of water that the mass is capable of absorbing moisture from a wet hand.

11. The method of making an abrasive form adapted to be set permanently by baking and to be subjected to baking heat immediately on being formed comprising mixing a temporary binder containing water with a mass comprising an abrasive, dry sodium silicate and clay, the water being in sufficient quantity to make the mass moldable but only such an amount of water that the mass is capable of absorbing moisture from a wet hand, molding the mass, and firing it immediately after molding.

In testimony whereof, I affix my signature.

PAUL KEEVER.